United States Patent [19]

Dhein et al.

[11] 4,396,736
[45] Aug. 2, 1983

[54] FLAME-PROOFED POLYAMIDE MOULDING MATERIALS

[75] Inventors: Rolf Dhein, Krefeld; Ludwig Rottmaier, Odenthal; Rudolf Merten, Leverkusen, all of Fed. Rep. of Germany; Wolfgang Siebourg, Pittsburgh, Pa.

[73] Assignee: Bayer Aktiengesellschaft, Leverkusen, Fed. Rep. of Germany

[21] Appl. No.: 278,655

[22] Filed: Jun. 29, 1981

[30] Foreign Application Priority Data

Jul. 21, 1980 [DE] Fed. Rep. of Germany ....... 3027622

[51] Int. Cl.³ .............................................. C08K 5/34
[52] U.S. Cl. .................................. 524/100; 524/105; 524/106
[58] Field of Search ............... 260/45.8 NB, 45.8 NT; 524/100, 105, 106

[56] References Cited

U.S. PATENT DOCUMENTS

| | | | |
|---|---|---|---|
| 3,660,344 | 5/1972 | Michael et al. | 260/45.8 NT |
| 3,980,616 | 9/1976 | Kimura et al. | 260/45.8 NT |
| 4,001,177 | 1/1977 | Tsutsumi et al. | 260/45.8 NT |
| 4,122,269 | 10/1978 | Chono et al. | 260/45.8 NT |
| 4,298,518 | 11/1981 | Ohmura et al. | 260/45.8 NT |

OTHER PUBLICATIONS

Takeda et al., C.A., vol. 85, 1976, 95277n.

*Primary Examiner*—John Kight, III
*Assistant Examiner*—R. A. White
*Attorney, Agent, or Firm*—Connolly and Hutz

[57] ABSTRACT

Polyamide moulding compositions containing triazolidine-3,5-diones or reaction products thereof as flame retarding agents.

4 Claims, No Drawings

FLAME-PROOFED POLYAMIDE MOULDING MATERIALS

Various processes have already been suggested to flame proove thermoplastics. Usually the resin is admixed with a flameproofing agent. Halogeneous and nitrogeneous compounds are among the known fire-retardant agents.

Halogen compounds are currently used on a commercial scale as highly-active fireproofing agents for polyamide moulding materials, optionally with the addition of synergistically acting metal compounds, or pulverised red phosphorus. These fireproofing agents and their use are described, for example in U.S. Pat. No. 3,418,267, German Auslegeschriften Nos. 1,694,494 and 1,931,387 and German Offenlegungsschrift No. 2,544,219.

Halogen compounds reduce the creep resistance of polyamide moulding materials. Furthermore, when burning takes place, hydrogen halide is evolved, possibly causing considerable corrosion in the region of the combustion area. Moulding materials containing halogen compounds also release hydrogen halide to a small extent at the elevated processing temperatures necessary in the processing machines and the halogen halide damages the machines.

Pulverulent red phosphorus can only be handled with difficulty because when it is in the presence of air and in contact with hot metal surfaces, under conditions which are generally present in the conventional production and processing machines for the moulding machines, it tends towards powder explosions.

Another disadvantage is the likelihood of the formaction of toxic phosphorus hydrogen compounds which may occur by reaction of the phosphorus with polyamides at the elevated processing temperatures of the moulding materials. Numerous additional process steps have been recommended, as described, for example, in German Auslegeschriften Nos. 2,308,104; 2,625,673 and 2,625,691, to control the formation of these compounds as far as possible.

Finally, the natural red colour of phosphorus complicates the establishment of light colour tones in the moulding materials. The quantity of white pigments required to conceal the red colour generally leads to a deterioration in the mechanical characteristics.

The addition of melamine has also been suggested in order to render flame-proof the polyamide resin materials (German Auslegeschrift No. 1,694,254), as well as the addition of cyanuric acid (U.S. Pat. No. 3,908,616) and the addition of melamine together with cyanuric acid (U.S. Pat. No. 4,001,177).

When melamine is added, as satisfactory flame proofing effect is obtained, but melamine may sublime under the moulding conditions and may be deposited on the mould. This behaviour is known as "flattening-out". As a result of it, the moulded body becomes loosened unintentionally or becomes stained.

It is for this reason that the products sometimes do not have a satisfactory appearance.

When cyanuric acid is added, the mechanical characteristics of the moulded body are impaired and an extensive immigration to the surface of the moulded article observed. When both cyanuric acid and melamine are added, it is necessary to use at least 10 parts by weight in 100 parts by weight of polyamide resin in order to achieve a satisfactory flameproofing result. The "flattening-out" and the immigration to the surface are considerable in this case as well.

By using the flameproofing agent according to the invention, it is possible to provide a polyamide moulding composition which exhibits satisfactory flame-proof characteristics, is suitable for the production of moulded bodies and, in particular, does not show the phenomenon mentioned above. Moreover, since all of the components are white or practically colourless, polyamide moulding materials can be obtained in light colours, having an improved flame resistance (according to US) without any of the disadvantages specified for the halogen compounds and for red phosphorus.

Therefore, an object of the present invention is to provide self-extinguishing, thermoplastic polyamide moulding compositions which may be reinforced wherein said polyamide contains from 0.1 to 20% by weight, based on the total moulding composition, of triazolidine-3,5-diones and/or reaction products of triazolidine-3,5-diones as a flameproofing agent.

Aromatic and aliphatic polyamides may be made flame-proof using the flameproofing agents of the invention. Therefore, for example, polyamides which are obtained by polymerising lactams having at least 7 ring members or corresponding ω-amino carboxylic acids, for example ε-caprolactam, aminocaproic acid, enatholactam, 7-aminohexanoic acid, 9-aminononanoic acid, 11-aminoundecanoic acid, α-pyrrolidone and piperidone, or polyamide resins which are obtained by the polycondensation of aliphatic diamines such as hexamethylene diamine, 2,2,4-, 2,4,4-trimethyl hexamethylenediamine, isophorone diamine, 1,3-, 1,4-bisamino cyclohexane, bis-amino-cyclohexyl-alkanes and xylylene diamine with aliphatic or aromatic discarboxylic acids such as adipic acid, sebacic acid, azelaic acid, dilauric acid, glutaric acid, cyclohexane carboxylic acid, isophthalic acid and terephthalic acid.

Polyamides are also introduced which are produced from the aliphatic dicarboxylic acids and aromatic diamines mentioned, for example 1,3- and 1,4-diamino benzene, and polyamide mixtures and copolyamides from all the components mentioned, provided that they are aliphatic or partly aliphatic polyamides. Polyamide-6 and polyamide-6,6 are particularly preferred to be flameprooved by the inventive agents.

Triazolidine-3,5-diones of the following general formula I are the preferred triazolidine-3,5-diones to be used according to the invention:

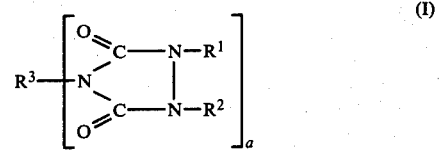

in which $R^1$ and $R^2$ which may be the same or different, represent hydrogen, an aliphatic $C_1$–$C_6$, cycloaliphatic $C_4$–$C_{10}$, araliphatic $C_7$–$C_{10}$ or aromatic $C_6$–$C_{10}$ radical which radicals may be all substituted with halogen or hydroxy or optionally with halogen substituted or an $C_1$–$C_6$-alkyl-carbonyl radical; preferably hydrogen, $C_1$–$C_4$-alkyl, $C_4$–$C_6$ cycloalkyl or phenyl radical substituted with $CH_3$; hydrogen being particularly preferred $R^3$ represents hydrogen, aliphatic $C_1$–$C_{20}$, cycloaliphatic $C_4$–$C_{17}$, araliphatic $C_7$–$C_{17}$ or aromatic $C_6$–$C_{15}$ radical, preferably an aliphatic $C_1$–$C_6$, cycloaliphatic $C_4$–$C_{10}$, or $CH_3$-substituted $C_6$–$C_{12}$ aromatic radical.

a represents an integer from 1 to 5, preferably from 2 to 5, 2 or 3 being particularly preferred.

The production of these triazolidine-3,5-diones of the general formula I is known from the literature and may be carried out, for example, by heating hydrazine-N,N'-dicarboxylic acid diamine to above 200° C. with the release of ammonia as described in German Patent Application No. 2,947,619.5; by reaction between mono- or diamines with hydrazo dicarbonamide with the release of ammonia; by reaction of isocyanates with semicarbazide with a subsequent cyclization as described in the German Patent Applications No. P 3027611.0 and P 30 27 612.1; by reaction of alkyl allophanate with optionally substituted hydrazine or by alkylating and/or acylating triazolidine-3,5-dione.

The following are mentioned as examples of suitable triazolidine-3,5-diones; triazolidine-3,5-dione, 1-,4-methyltriazolidine-3,5-dione; 1-,4-phenyl-triazolidine-3,5-dione; 4-(4-chlorophenyl)-, 4-(4-bromophenyl)-triazolidine-3,5-dione; 4-(2,4-dichlorophenyl)-triazolidine-3,5-dione; 1,2-diacetyl-triazolidine-3,5-dione; bis-(triazolidine-3,5-dione-4yl)-methane, 1,2-bis-(triazolidine-4-yl)-ethane and 1,6-bis-(triazolidine-3,5-dione-4yl)-hexane.

As reaction products of triazolidine-3,5-diones to be preferably used according to the invention, salts may be used, such as the triazolidine-3,5-dione salts of the following general formula II, produced from triazolidine-3,5-diones and organic amines

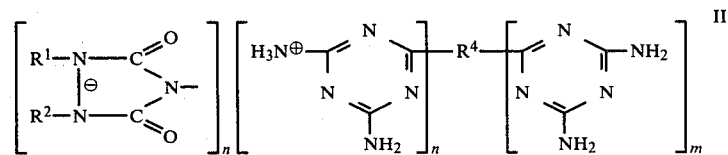

in which $R^1$ and $R^2$ have the definition given above;

$R^4$ represents hydrogen, an amino group, $C_1$–$C_{20}$ preferably $C_1$–$C_{10}$ aliphatic; $C_4$–$C_{17}$ preferably $C_5$–$C_{10}$ cycloaliphatic, $C_7$–$C_{17}$ preferably $C_7$–$C_{10}$ araliphatic or $C_6$–$C_{15}$, preferably $C_6$–$C_{10}$, aromatic radical which radical may be all substituted by halogen; preferably an $NH_2$-group;

n represents an integer from 1 to 4, preferably 1 to 2, m represents an integer of from 0 to 3, whereas m+n can be only 4 at maximum Triazolidine-3,5-dione salts which are particularly preferred are those of the general formula IIa and IIb:

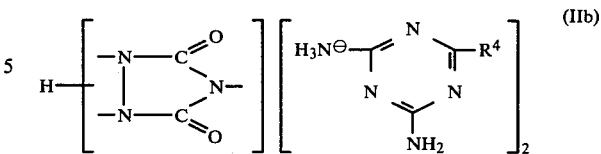

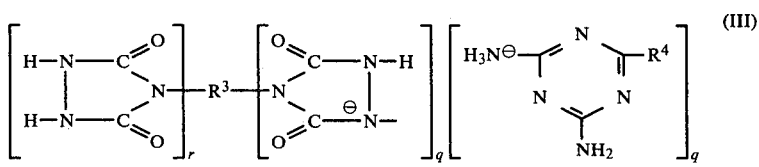

in which $R^4$ has the definition given above.

Other triazolidine-3,5-dione-salts to be used according to the invention are those of the general formula III.

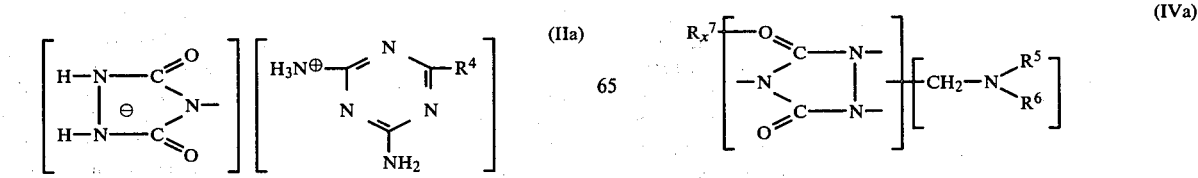

wherein $R^3$ and $R^4$ have the definition given above, and q represents an integer from 1 to 5, r represents an integer of from 0 to 4, provided q and r can only amount to 5 at maximum.

Triazolidine-3,5-dione-salts from triazolidine-3,5-dione and melamine and/or 1,2-bis(4,6-diamino-1,3,5-triazine-2-yl) ethane and/or 1,4-bis(4,6-diamino-1,3,5-triazine-2-yl) butane and/or 1,6-bis-and/or 1,3,6-tris (4.6-diamino-1,3,5-triazine-2-yl)-hexane, and from melamine and bis-(triazolidine-3,5-dione-yl-4) ethane and/or 1,6-bis-(triazolidine-3,5-dione-yl-4)-hexane and/or 4,4'-bis-(triazolidine-3,5-dione-yl-4)-dicyclohexylmethane are preferred. Salts from one mol of triazolidine-3,5-dione and 1 mol or 2 mols of melamine are particularly preferred.

These triazolidine-3,5-dione salts are produced from triazolidine-3,5-diones and the corresponding amines optionally under elevated pressure preferably at temperatures of from 30° to 130° C. in suitable solvents, preferably in water.

Mannich bases of the general formulae IVa and IVb may also be used as reaction products of triazolidine-3,5-diones according to the invention:

(IVa)

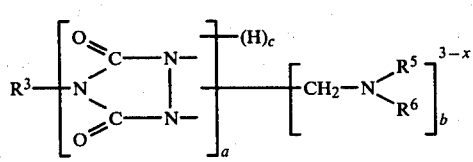 (IVb)

in which

R³ has the definition except for hydrogen given above,

R⁵ represents hydrogen, a $C_1-C_{10}$ aliphatic, $C_4-C_{10}$ cycloaliphatic, $C_7-C_{10}$ araliphatic, $C_6-C_{10}$ aromatic radical which radicals may be all substituted by halogen, hydroxy or $C_1-C_4$ alkoxy, or an aryl or $C_2-C_8$ cycloaliphatic radical containing hetero atoms such as N, O or S and/or carbonyl groups in the ring, R⁶ represents a $C_1-C_{10}$ aliphatic, $C_4-C_{10}$ cycloaliphatic $C_7-C_{10}$ araliphatic, $C_6-C_{10}$ aromatic radical which radicals may be also substituted by halogen, cyanogen, hydroxy, amino, $C_1-C_4$-alkyl or dialkyl amino, $C_1-C_4$-alkoxy, hydroxy carbonyl or $C_1-C_4$ alkoxy carbonyl; or an aryl or $C_2-C_{12}$ cycloaliphatic radical containing hetero atoms such as N, O, or S carbonyl groups in the ring, R⁷ represents hydrogen, a $C_1-C_6$ aliphatic, $C_4-C_{10}$ cycloaliphatic, $C_7-C_{10}$ araliphatic or $C_6-C_{10}$ aromatic radical which radicals may be all substituted by halogen or hydroxy x represents from 0 to 2, a represents an integer from 1 to 5, preferably from 1 to 3, b represents an integer from 1 to 2 α and c represents an integer from 2a–b.

Mannich bases of the general formula IV which are particularly preferred are those in which R⁵ represents hydrogen or a low alkyl radical and R⁶ represents

in which

R⁸ represents a $C_1-C_{10}$ preferably $C_1-C_4$ aliphatic, $C_4-C_{10}$ preferably $C_5-C_6$ cycloaliphatic, $C_7-C_{15}$ preferably $C_7-C_{10}$ araliphatic or $C_6-C_{10}$, preferably phenyl aromatic radical.

The radicals R⁵ and R⁸ may also be linked together as members of a cyclic $C_2-C_8$-radical which may contain further hetero atoms such as N, O, S and/or carbonyl groups in the ring.

These compounds are preferably derived from amides such as acetamide, lactams such as caprolactam, parabanic acid, bis-parabanic acids, hydantoins, bis-hydantoins linked together via the 1,1- or 3,3-position, barbituric acid, cyclic imides such as succinic acid imide and phthalic acid imide.

Further Mannich bases of the general formula IV which are particularly preferred are those in which the radical R⁵ represents hydrogen atom and R⁶ represents the radical

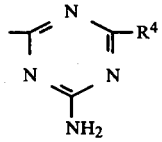

in which

R⁴ is defined as above,

In addition, as Mannich, bases from triazolidine-3,5-diones can be used those of the general formula V

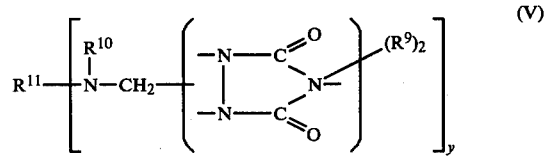 (V)

in which

R⁹ represents hydrogen, a $C_2-C_{10}$ alkylcarbonyl radical or a $C_1-C_{10}$ aliphatic, $C_4-C_{10}$ cycloaliphatic $C_7-C_{10}$ araliphatic or $C_6-C_{10}$ aromatic radical which radicals may be substituted by halogen or hydroxy.

R¹⁰ represents hydrogen, or a $C_1-C_{10}$ aliphatic, $C_4-C_{10}$ cycloaliphatic, $C_7-C_{10}$ araliphatic, or $C_6-C_{10}$ aromatic radical which radical may be all substituted by halogen, hydroxy or $C_1-C_4$ alkoxy; or a radical of the following general formula

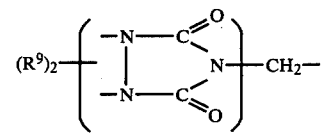

R¹¹ represents a carbonyl group, a $C_1-C_{10}$ aliphatic $C_4-C_{10}$ cycloaliphatic, $C_7-C_{10}$ araliphatic $C_6-C_{10}$ aromatic radical which radicals may be all substituted by halogen, cyanogen, hydroxy, amino, $C_1-C_{10}$ alkyl or dialkyl amino, $C_1-C_{10}$ alkoxy, hydroxycarbonyl or $C_2-C_{10}$ alkoxycarbonyl; or an aryl or $C_2-C_8$ cycloalkyl radical containing hetero atoms such as N, O or S or carbonyl groups in the ring, and Y represents an integer from 1 to 3.

Mannich bases of the general formula V which are particularly preferred are those in which the radical R¹¹ represents:

wherein

R⁸ is as defined above, or represents a radical of the general formula

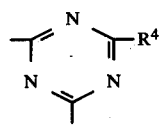

in which

R⁴ has the definition given above and additionally represents a bond; preferably hydrogen or a bond.

The Mannich bases of the general formulae IV and V produced from triazolidine-3,5-dione and to be used according to the invention are obtained by reacting triazolidine-3,5-diones with formaldehyde, preferably as an aqueous solution, and the corresponding NH compounds, optionally in the presence of suitable catalysts at temperatures of from 10° to 180° C., optionally under elevated pressure.

Triazolidine-3,5-diones or reaction products from triazolidine-3,5-diones are added to the polyamide resin in a quantity of from 0.1 to 20% by weight. When using triazolidine-3,5-diones, a quantity of from 0.1 to 5% by weight, preferably from 0.2 to 1.5% by weight is sufficient for satisfactory flame proofing. The reaction products of triazolidine-3,5-diones are preferably added to the polyamide resin in a quantity of from 1 to 20% by weight, more preferably from 3 to 15% by weight.

Reinforcing materials and fillers may be present in the polyamide moulding compositions to an extent of as much as 60% by weight, based on the moulding composition. The following materials, among others, may be used; glass fibres, carbon fibres, asbestos, glass balls, talcum, mica, wollastonite, microvite, chalk, silicon dioxide, graphite, gypsum and other additives, such as pigments and dyes, for example cadmium sulphide, phthalocycanines and titanium dioxide.

As other flameproofing agents, a copper compound and an alkali metal halide may be added to the polyamide moulding materials in quantities of from 0.001 to 1% by weight.

Suitable copper compounds preferably include inorganic and organic copper salts.

The following are mentioned by way of example: copper-I-chloride, copper-II-sulphate, copper-I-iodide, copper-II-phosphate, copper-II-acetate, copper-II-stearate, copper-II-benzoate and copper-chelate compounds.

Suitable alkali metal halides include potassium iodide, potassium bromide, sodium chloride and sodium bromide.

Aromatic and/or higher aliphatic carboxylic acids and the alkali metal or alkaline earth metal salts thereof, for example sodium stearate, calcium stearate, isophthalic acid and terephthalic acid, may be incorporated in the polyamide resin materials of the invention as auxiliary materials and additives, in quantities of from 0.1 to 1% by weight.

It is also possible to add any known antistatic agents such as conductive carbon black or quaternary ammonium salts.

The additives may be admixed with the polyamide according to known processes, preferably before the moulding step. The simplest process comprises admixing the dry additives with the polyamide resin. The mixed dry material may then be extruded to produce a granulate. The additives may also be admixed with the molten polyamide resin material in the extruder via known metering devices. It is also possible initially to produce concentrates by admixing large quantities of the additives with the polyamide resin and then admixing these concentrate-granulates with the polyamide resin.

The moulded articles may be produced by moulding the intermixed material or the granulates using various moulding machines, in particular injection moulding machines, extruding machines or pressing machines. The additives may also be incorporated using the moulding machine.

The temperature required for incorporating the additives is determined substantially by the fusing temperature of the polyamide to be used. The processing temperature should usually be at least 10°, but not more than 30°, above softening temperature of the polyamide, for example, for polyamide-6,6 it is below 270° C. and for polyamide-6, temperatures of below 250° C. are sufficient.

The polyamide resin materials of the present invention exhibit outstanding flame resistance and heat resistance with outstanding mechanical properties and an outstanding processibility and pressability and also do not show the flattening-out and immigration phenomena. The polyamide resin materials can also be obtained in light colours, because all of the compounds are white or colourless.

In the following Examples, the percentages are % by weight and the parts are parts by weight, unless indicated otherwise.

EXAMPLES (A) Production of melamine-triazolidine-3,5-dione-salt 4.41 kg of melamine are dissolved in 105 l of water by heating to 95° C. and are mixed with 3.73 kg of a commercial, 94.7% triazolidine-3,5-dione (determined by titration with n/10 sodium hydroxide against phenolphthalein). The suspension obtained is stirred again for 3 hours at 95° C. to complete the reaction, cooled to room temperature, filtered with suction, washed with water and dried at 85° C. under vacuum at 30 mbar (yield 6.9 kg=90.4% of the theoretical yield). IR-spectrum and elementary analysis confirm the salt structure assumed.

Calculated for $C_5H_9N_9O_2$: C=26.4%. H=3.96% N=55.5%

Found: C=26.3%. H=3.9% N=55.1%

(B) Production of a Mannich base from melamin, formaldehyde and triazolidine-3,5-dione 3.03 kg of triazolidone-3,5-dione are added with stirring to 9.75 kg of a 37% aqueous formaldehyde solution, containing 10 g of borax and the mixture is heated to 100° C. The resulting clear solution is stirred for 90 minutes at 100° C. and concentrated in a water jet vacuum by distilling off the water, surplus formaldehyde also being removed. The light yellow viscous liquid, mainly trishyroxymethyltriazolidine-3,5-dione is cooled and dissolved in 90 l of deionised water at room temperature, mixed with 11.34 kg of melamine and slowly heated up to reflux of the water. The resulting mixture is stirred for 2 hours under reflux filtered with suction at 90° C. and washed with hot water. After drying at 100° C. and at 30 mbar, 14.55 kg of Mannich base are obtained, the structure of which is confirmed by IR-spectrum and elementary analysis.

Calculated for $C_{14}H_{21}N_{21}O_2$: C=32.7%. H=4.08% N=57.1%

Found: C=32.9%. H=4.2%. N=56.5%

(C) Production of a triazolidine-3,5-dione of general formula T ($R^1.R^2$=H, $R^3$=—$CH_2$—$CH_2$—l)

600 g of hydrazine dicarboxylic acid diamide and 150 g of 1,2-diamine ethane are stirred in 500 ml of N-methylpyrrolidone for 4 hours at 175° C. and 20 hours at 200° C. During cooling, a deposit is precipitated which is filtered with suction and washed with ethanol. 462 g (80% of the theoretical yield) of 1,2-ethanediyl- 4,4'-bis-triazolidine-3,5-dione are obtained as colourless crystals with a melting point of >350° C.

Calculated for $C_6H_8N_6O_4$: C=31.6% H=3.53% N=36.8%

Found: C=31.4%. H=3.6% N=36.8%

EXAMPLES 1–10

The flameproofing agents according to the invention were incorporated into the polyamides, optionally together with glass fibres, on a double shaft extruder ZSK 53 belonging to Werner and Pfleiderer, under normal conditions for polyamides. The strand which is drawn off is cooled, granulated and dried. The granulated material is then injected on an injection moulding machine A 270 (made by Arburg) into sample bodies with dimensions of 127×12.7×1.6 mm.

These sample bodies are stores for 24 hours at 23° C. and 50% relative air humidity and are then subjected to a test according to Underwriter's Laboratories (UL) Subject 94 "Vertical Burning Test for Classifying Materials".

Table 1 specifies the composition of the test bodies, their classification according to UL-Subject 94 and the afterburning times 10 flamings, in order to establish the improved fireproofing effect.

No flattening phenomena could be observed for any of the test bodies during or after the injection procedure even during a comparatively long period of time. After storage for 7 days at 70° C. in a drying chamber, all of the test bodies retained their surface gloss.

(A) 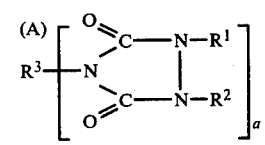 (I)

wherein
$R^1$ and $R^2$ are each hydrogen, $C_1$–$C_4$ alkyl, $C_4$–$C_6$ cycloalkyl or phenyl substituted by $CH_3$,
$R^3$ is a $C_1$–$C_6$ aliphatic, $C_4$–$C_{10}$ cycloaliphatic or a $CH_3$-substituted $C_6$–$C_{12}$ aromatic radical and
a is an integer from 2 to 5;

(B) 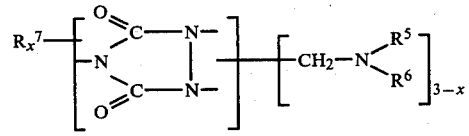 (IVa)

wherein
$R^5$ individually is hydrogen; a $C_1$–$C_{10}$ aliphatic radical; a $C_4$–$C_{10}$ cycloaliphatic radical; a $C_7$–$C_{10}$ araliphatic radical; a $C_6$–$C_{10}$ aromatic radical; or one of said radicals substituted by halogen, hydroxy or $C_1$–$C_4$ alkoxy;
$R^6$ individually is a $C_1$–$C_{10}$ aliphatic radical; a $C_4$–$C_{10}$ cycloaliphatic radical; a $C_7$–$C_{10}$ araliphatic radical;

TABLE 1

| Example No. Polyamide/+ $\eta$rel | % by weight in the mixture | flameproofing agent in % by weight | other additives | UL-Subject 94 127 × 12.7 × 1.6 mm | afterburning time (sec) |
|---|---|---|---|---|---|
| 1 PA-6/3.01 | 100 | — | — | V-2 | 44 |
| 2 PA-6/3.01 | 99.5 | 0.5% C | — | V-2 | 12 |
| 3 Pa-6/3.01 | 95 | 5% A | — | V-0 | 10 |
| 4 PA-6.6/2.96 | 100 | — | — | V-2 | 32 |
| 5 PA-6.6/2.96 | 99.5 | 0.5% C | — | V-0 | 10 |
| 6 PA-6.6/2.96 | 85 | 15% B | — | V-2 | 11 |
| 7 PA from isophthalic acid and hexamethylene diamine/2.7 | 100 | — | — | V-2 | 40 |
| 8 PA from isophthalic acid and hexamethylene diamine/2.7 | 99.5 | 0.5% C | — | V-2 | 15 |
| 9 PA from isophthalic acid and hexamethylene diamine/2.7 | 70.1 | — | 29.9% glass fibres | did not pass** | >60 |
| 10 PA from isophthalic acid and hexamethylene diamine/2.7 | 60 | 10% A | 30% glass fibres | V-2 | 21 |

*relative viscosity, measured in a solution of 1 g of polyamide in 100 ml of m-cresol at 25° C.
**Test body burns down to the holding clamp.

a $C_6$–$C_{10}$ aromatic radical; or one of said radicals substituted by halogen, cyano, hydroxy, amino, $C_1$–$C_4$ alkylamino, $C_1$–$C_4$ dialkylamino, $C_1$–$C_4$ alkoxy,

We claim:
1. A self-extinguishing, optionally reinforced thermoplastic polyamide molding composition containing alkyl as a flame-proofing agent from 0.1 to 20% by weight of a compound selected from the group consisting of

hydroxycarbonyl or $C_2$–$C_4$ alkoxycarbonyl;

$R^5$ and $R^6$ taken together with the nitrogen atom to which each are joined form a cyclic $C_2$–$C_8$ heterocyclic radical;

$R^7$ is hydrogen; a $C_1$–$C_6$ aliphatic radical; a $C_4$–$C_{10}$ cycloaliphatic radical; a $C_7$–$C_{10}$ araliphatic radical; a $C_6$–$C_{10}$ aromatic radical or one of said radicals substituted by halogen or hydroxy and x is 0 to 2;

(C) 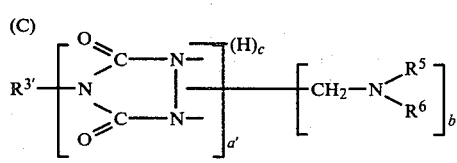 (IVb)

wherein $R^{3'}$ is hydrogen, a $C_1$–$C_{20}$ aliphatic radical, a $C_4$–$C_{17}$ cycloaliphatic radical, a $C_7$–$C_{17}$ araliphatic radical, or a $C_6$–$C_{15}$ aromatic radical;

$R^5$ and $R^6$ are as defined above in (B);

a' is a integer of from 1 to 5;

b is an integer of from 1 to 2a' and c is an integer of from 2a'–b and (D) 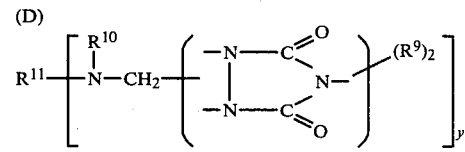 (V)

wherein $R^9$ is hydrogen; a $C_2$–$C_{10}$ alkylcarbonyl radical; a $C_1$–$C_{10}$ aliphatic radical; $C_4$–$C_{10}$ cycloaliphatic radical; a $C_7$–$C_{10}$ araliphatic radical; a $C_6$–$C_{10}$ aromatic radical or one of said radicals substituted by halogen or hydroxy;

$R^{10}$ is a hydrogen; a $C_1$–$C_{10}$ aliphatic radical; a $C_4$–$C_{10}$ cycloaliphatic radical; a $C_7$–$C_{10}$ araliphatic radical; a $C_6$–$C_{10}$ aromatic radical; or one of said radicals substituted by halogen; hydroxy or $C_1$–$C_4$ alkoxy; or a radical of the formula

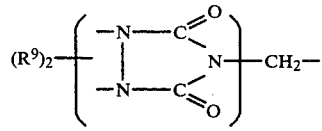

wherein $R^9$ is as aforesaid;

$R^{11}$ is a $C_1$–$C_{10}$ aliphatic radical; a $C_4$–$C_{10}$ cycloaliphatic radical; a $C_7$–$C_{10}$ araliphatic radical; a $C_6$–$C_{10}$ aromatic radical; one of said radicals substituted by halogen, cyano, hydroxy, amino, $C_1$–$C_{10}$ alkylamino, $C_1$–$C_{10}$ dialkylamino, $C_1$–$C_{10}$ alkoxy

, hydroxycarbonyl or $C_2$–$C_{10}$ alkoxycarbonyl; a carbonyl group; a group of the formula

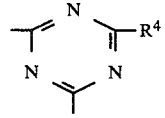

wherein $R^4$ is a bond; hydrogen; an amino group; a $C_1$–$C_{20}$ aliphatic radical; a $C_4$–$C_{17}$ cycloaliphatic radical; a $C_7$–$C_{17}$ araliphatic radical; a $C_6$–$C_{15}$ aromatic radical or one of said radicals substituted by halogen.

2. A polyamide molding composition as claimed in claim 1 wherein in (B) and (C) $R^5$ is hydrogen or lower alkyl and $R^6$ is one of said radicals substituted by

.

3. A polyamide molding composition as claimed in claim 1 wherein in (D) $R^{11}$ is one of said radicals substituted by

.

4. A polyamide molding composition as claimed in claim 1 wherein in (D) $R^{11}$ is a group of said formula

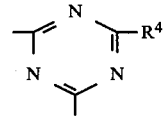

wherein $R^4$ is a bond; hydrogen; an amino group; a $C_1$–$C_{20}$ aliphatic radical; a $C_4$–$C_{17}$ cycloaliphatic radical; a $C_7$–$C_{17}$ araliphatic radical; a $C_6$–$C_{15}$ aromatic radical or one of said radicals substituted by halogen.

* * * * *